US008259318B2

(12) United States Patent
Miyajima

(10) Patent No.: US 8,259,318 B2
(45) Date of Patent: Sep. 4, 2012

(54) PRINTING APPARATUS AND INFORMATION PROCESSING APPARATUS

(75) Inventor: Jun Miyajima, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 1192 days.

(21) Appl. No.: 11/691,009

(22) Filed: Mar. 26, 2007

(65) Prior Publication Data

US 2007/0223030 A1 Sep. 27, 2007

(30) Foreign Application Priority Data

Mar. 27, 2006 (JP) .................................. 2006-085566

(51) Int. Cl.
*G06K 15/00* (2006.01)
*G06F 3/12* (2006.01)
*G06F 7/04* (2006.01)

(52) U.S. Cl. .......................... 358/1.14; 358/1.15; 726/16
(58) Field of Classification Search ................. 358/1.15; 709/226, 229
See application file for complete search history.

(56) References Cited

U.S. PATENT DOCUMENTS

| 7,454,796 | B2  |   | 11/2008 | Mazzagatte et al. |             |
|-----------|-----|---|---------|-------------------|-------------|
| 7,574,440 | B2  | * | 8/2009  | Kichikawa et al.  | ......... 1/1 |
| 7,729,000 | B2  | * | 6/2010  | Shudo             | .... 358/1.15 |
| 2003/0208607 | A1 | * | 11/2003 | Yamazaki        | ...... 709/229 |
| 2003/0223093 | A1 | * | 12/2003 | Baird et al.    | .... 358/1.15 |
| 2005/0183141 | A1 | * | 8/2005  | Sawada          | ........ 726/16 |
| 2005/0275885 | A1 | * | 12/2005 | Sugiyama        | .... 358/1.15 |
| 2006/0001898 | A1 | * | 1/2006  | Maeshima et al. | .... 358/1.14 |
| 2006/0028530 | A1 | * | 2/2006  | Nishiyama       | ...... 347/153 |
| 2007/0052993 | A1 | * | 3/2007  | Anno             | .... 358/1.14 |

FOREIGN PATENT DOCUMENTS

| JP | 08-223340 A   | 8/1996  |
|----|---------------|---------|
| JP | 2002-287932 A | 10/2002 |

* cited by examiner

*Primary Examiner* — Marivelisse Santiago Cordero
*Assistant Examiner* — Mesfin Getaneh
(74) *Attorney, Agent, or Firm* — Carter, DeLuca, Farrell & Schmidt LLP

(57) ABSTRACT

A printing apparatus including a reception unit configured to receive print data, a first identification unit configured to identify user information contained in the received print data, a first determination unit configured to determine whether there is any user currently logged onto the printing apparatus, a second identification unit configured to identify user information corresponding to a currently logged on user, a second determination unit configured to determine whether the user information is identical, a suspending unit configured to suspend print processing when the user information are not identical to each other, a printing unit configured to print the print data when the user information are identical to each other, and print the print data in response to a log-out action of the currently logged on user when the print data is suspended by the suspending unit, and an inhibition unit configured to inhibit a log-in action based on different user information.

7 Claims, 18 Drawing Sheets

FIG.16

PRINT

PRINTER
PRINTER NAME (N): [MULTIFUNCTION PERIPHERAL] [PROPETY (P)]
STATE: IDLING
TYPE: xxxx xx 0000 LIPS
LOCATION: IP_192.168.0.10
COMMENT:
☐ OUTPUT TO FILE (L)

PRINT REGION
⊙ ALL (A)
○ CURRENT PAGE (E)   ○ SELECTED PORTION (S)
○ DESIGNATED PAGE (G): [　　　]
PLEASE DESIGNATE PAGE NUMBERS WITH
COMMA (S), E.G., 1, 3, AND 6, OR DESIGNATE A
REGION OF PAGES, E.G., 4-8

PRINT NUMBER
NUMBER OF COPIES (C): [1 ▲▼]
☑ PRINT BY UNIT (T)

PRINT OBJECT (W): [DOCUMENT ▼]
PRINT DESIGNATION (R): [ALL PAGES ▼]

ENLARGE/REDUCE
PAGE NUMBER PER SHEET (H): [1 PAGE ▼]
DESIGNATION OF PAPER SIZE (Z): [NO SIZE DESIGNATION ▼]

[OPTION (O)...]   [OK] [CANCEL]

1601

PRINTING APPARATUS AND INFORMATION PROCESSING APPARATUS

BACKGROUND OF THE INVENTION

1. Field of the Invention

The present invention relates to a printing apparatus capable of receiving print data from an information processing apparatus and printing the received print data. Furthermore, the present invention relates to an information processing apparatus capable of transmitting print data to the printing apparatus.

2. Description of the Related Art

In an office environment, where a plurality of users work, a printing apparatus can be provided for common uses. In particular, a multifunction peripheral is operable by many users as a printer, a copying machine, a facsimile machine, and a scanner. In a situation where a user inputs copy settings on an operation panel, a multifunction peripheral may output printed sheets based on a print job requested by another user.

In this case, a user performing copy settings may see and know the contents of other user's printing product output from the multifunction peripheral. Furthermore, during a printout operation of a print job, the multifunction peripheral does not start another print processing (e.g., printout operation) and accordingly other users are required to wait unit preceding print jobs are completed.

In addition, if a multifunction peripheral has only one discharge tray, printed sheets of a print job requested by one user may be mixed with printed sheets of a different print job requested by another user.

To solve such problems, as discussed in Japanese Patent Application Laid-open No. 8-223340, a multifunction peripheral can stop outputting printed sheets of a print job requested by an external user when the multifunction peripheral is manipulated by a different user. In this case, if a user's operation is not made on the multifunction peripheral in a predetermined time, the multifunction peripheral restarts outputting printed sheets of the suspended print job.

According to this technique, a user can easily manipulate a multifunction peripheral and can quickly finish copy settings without waiting for the copy processing requested by an external user to be completed. Furthermore, the contents of a print job requested by an external user cannot be seen and known by other user manipulating the multifunction peripheral. However, since the multifunction peripheral is operable by another user while a print job is being performed, another user may have a chance to see printed sheets output from the multifunction peripheral.

Moreover, according to the above described technique, the multifunction peripheral does not check a relationship between a user manipulating the operation panel and a user currently executing print job. Therefore, the multifunction peripheral may stop outputting printed sheets of a print job even if a user of the print job is identical to the manipulating user. As a result, the multifunction peripheral can reduce the processing efficiency.

If an external user can identify another user manipulating a multifunction peripheral, the external user can determine to stop or suspend transmitting a print job from an external apparatus and the above problem is solved. However, the external user typically does not know the presence of any user currently manipulating the multifunction peripheral.

SUMMARY OF THE INVENTION

Exemplary embodiments of the present invention are directed to a technique capable of efficiently performing print processing when a user requests a print job.

According to an aspect of the present invention, a printing apparatus includes a reception unit configured to receive print data, a first identification unit configured to identify user information contained in the received print data, a first determination unit configured to determine whether there is any user currently logged onto the printing apparatus, a second identification unit configured to identify user information corresponding to a currently logged on user when the first determination unit determines that the currently logged on user is present, a second determination unit configured to determine whether the user information identified by the first identification unit is identical to the user information identified by the second identification unit, a suspending unit configured to suspend print processing of the print data received by the reception unit when the second determination unit determines that the user information identified by the first identification unit is not identical with the user information identified by the second identification unit, a printing unit configured to print the print data received by the reception unit when the second determination unit determines that the user information identified by the first identification unit and the user information identified by the second identification unit are identical to each other, and print the print data in response to a log-out action of the currently logged on user when the print data is suspended by the suspending unit, and an inhibition unit configured to inhibit a log-in action based on user information different from the user information corresponding to the print data when the printing unit is currently executing print processing of the print data.

According to another aspect of the present invention, an information processing apparatus capable of communicating with a printing apparatus includes a reception unit configured to receive an instruction to transmit print data to the printing apparatus, an acquisition unit configured to obtain log-in information from the printing apparatus, and a display unit configured to display user information of a user logged onto the printing apparatus based on the log-in information obtained by the acquisition unit. The information processing apparatus may include a second reception unit configured to receive user information of a user operating the information processing apparatus and a determination unit configured to determine whether user information of the logged in user is identical to user information received by the second reception unit, wherein the display unit does not display the user information of the logged on user when the determination unit determines that the user information of the logged on user and the user information received by the second reception unit are identical to each other, and displays the user information of the logged on user when the user information of the logged on user and the user information received by the second reception unit are not identical to each other.

Further features and aspects of the present invention will become apparent from the following detailed description of exemplary embodiments with reference to the attached drawings.

BRIEF DESCRIPTION OF THE DRAWINGS

The accompanying drawings, which are incorporated in and constitute a part of the specification, illustrate exemplary embodiments, features, and aspects of the invention and, together with the description, serve to explain the principles of the invention.

FIG. 16 illustrates an exemplary screen displayed on a display device of the computer according to the exemplary embodiment of the present embodiment.

DETAILED DESCRIPTION OF THE EMBODIMENTS

Figure 1:
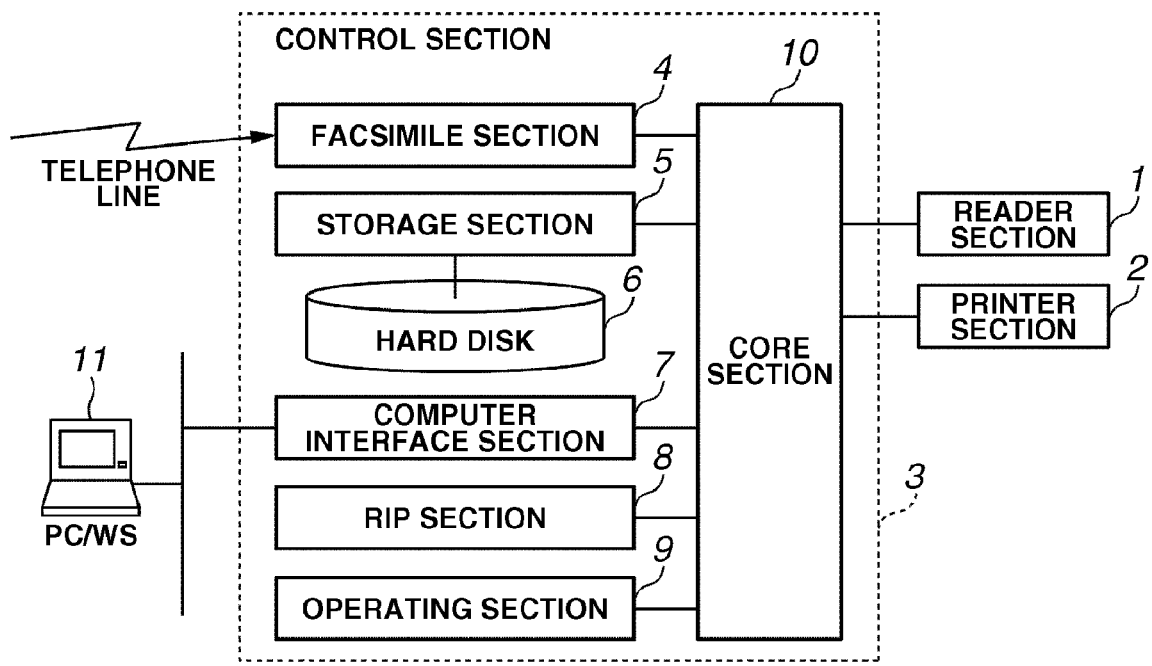
FIG. 1 is a block diagram illustrating an arrangement of a multifunction peripheral according to an exemplary embodiment of the present invention.

The following description of exemplary embodiments is merely illustrative in nature and is in no way intended to limit the invention, its application, or uses.

Processes, techniques, apparatus, and systems as known by one of ordinary skill in the art may not be discussed in detail but are intended to be part of the enabling description where appropriate.

For example, certain circuitry for print data processing and other uses may not be discussed in detail. However, these systems and the methods to fabricate these system as known by one of ordinary skill in the relevant art is intended to be part of the enabling disclosure herein where appropriate.

It is noted that throughout the specification, similar reference numerals and letters refer to similar items in the following figures, and thus once an item is defined in one figure, it may not be discussed for following figures.

Exemplary embodiments will be described in detail below with reference to the drawings.

FIG. 1 is a block diagram illustrating an arrangement of a multifunction peripheral according to an exemplary embodiment of the present invention. The printing apparatus according to the present embodiment is a multifunction peripheral having a printing function, a reading function, and a facsimile function, or can be a printer, a facsimile machine, or other apparatus.

The multifunction peripheral includes a reader section 1, a printer section 2, and a control section 3. The control section 3 includes a facsimile section 4, a storage section 5, a hard disk 6, a computer interface section 7, a raster image processing (RIP) section 8, an operating section 9, and a core section 10. The control section 3 is connected to the reader section 1, the printer section 2, a computer 11, and a telephone line.

The reader section 1 can read an image of a document (i.e., an original) and can transmit image data corresponding to the read document image to the control section 3. The printer section 2 can record an image on a recording sheet based on the image data received from the control section 3.

The facsimile section 4 of the control section 3 can receive compressed image data via a telephone line and decompress the received image data. The facsimile section 4 can transfer the decompressed image data to the core section 10. Furthermore, the facsimile section 4 can compress image data transferred from the core section 10 and transmit the compressed image data to an external device via the telephone line.

The storage section 5 can compress image data transferred from the core section 10 and store the compressed image data together with an ID number of the image data into the hard disk 6. The ID number is required when the image data is retrieved. The storage section 5 can retrieve compressed image data from the hard disk 6 based on code data transferred via the core section 10. The storage section 5 reads and decompresses the retrieved compressed image data, and transfers the decompressed image data to the core section 10.

The hard disk 6, which is connected to the storage section 5, can temporarily store transmitted/received image data. The computer interface section 7 can function as an interface between the core section 10 and the information processing apparatus such as the personal computer 11 (or a work station). The computer interface section 7 and the computer 11 can be connected via a one-to-one local interface or via a LAN or other network.

The RIP section 8 receives print data (i.e., code data (PDL data) representing an image to be printed) from the computer 11 and expands the received data into image data that the printer section 2 can record. The operating section 9, equipped, for example, with a touch panel display and hard keys, enables a user to input action instructions and settings to the multifunction peripheral via a user interface.

The core section 10 can control the flow of data among the reader section 1, the facsimile section 4, the storage section 5, the computer interface section 7, the RIP section 8, and the operating section 9. The core section 10 will be described below. The computer 11 is an information processing apparatus, such as a personal computer or a work station, which is connected via the computer interface section 7 of the control section 3 to the multifunction peripheral. The computer 11 can transmit and receive data to and from the multifunction peripheral.

Figure 2:
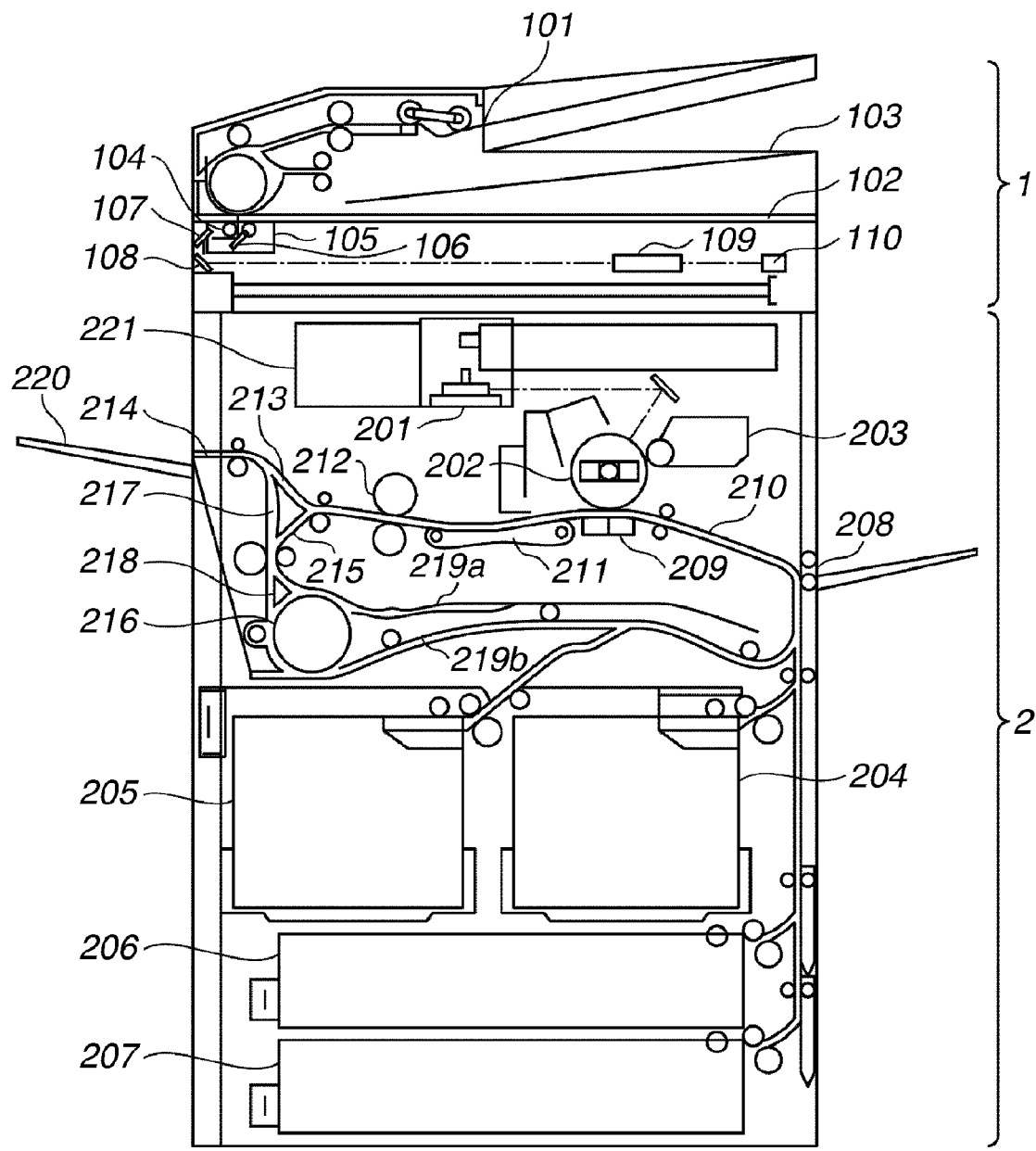
FIG. 2 is a cross-sectional diagram illustrating detailed mechanisms of a reader section and a printer section of the multifunction peripheral according to the exemplary embodiment of the present embodiment.

FIG. 2 is a cross-sectional diagram illustrating an exemplary arrangement of the reader section 1 and the printer section 2 of the multifunction peripheral according to the present embodiment.

The reader section 1 includes a document feeding unit 101 which is capable of feeding document sheets one by one onto a platen glass 102 and, when a document reading action is finished, capable of discharging the document sheet from the platen glass 102 to a discharge tray 103. When a document (i.e., original) is placed on the platen glass 102, a lamp 104 turns on and an optical unit 105 starts shifting in a horizontal direction to expose and scan the document. Mirrors 106, 107, and 108 and a lens 109 can guide the light reflected from the document toward a CCD image sensor (hereinafter, referred to CCD) 110. CCD 110 reads a scanned document image and outputs image data. The image data produced from CCD 110 is subjected to predetermined processing and transferred to the printer section 2 and the core section 10 of the control section 3.

The printer section 2 includes a laser driver 221 that drives a laser emitting section 201. The laser emitting section 201 emits a laser beam according to image data output from the core section 10 of the control section 3. A photosensitive drum 202 forms a latent image thereon when the photosensitive drum 202 is irradiated with the laser beam. A developing unit 203 puts developer to a portion corresponding to the latent image formed on the photosensitive drum 202.

The printer section 2 includes a plurality of drawer-type cassettes (i.e., cassette 204, cassette 205, cassette 206, and cassette 207) as sheet storage units capable of storing sheets of predetermined sizes. Furthermore, the printer section 2 includes a manual feeding tray 208 that protrudes outward from the printer body. Conventionally, when sheets are replenished, except for the manual feeding tray 208, the cassettes are drawn out, sheets are supplied to the cassettes, and the cassettes are put back.

The printer section 2 includes a mechanism for feeding a recording sheet from any one of the cassettes in synchronism with emission start timing of a laser beam, carrying the recording sheet along a carrying path 210 to a transfer section 209, and transferring the developer adhered on the photosensitive drum 202 onto the recording sheet. The recording sheet, with the developer put thereon, is then carried to a fixing section 212 by a carrying belt 211. The fixing section 212 generates heat and pressure to fix the developer onto the recording sheet. Subsequently, the recording sheet, having passed through the fixing section 212, is discharged along a carrying path 213 and a carrying path 214.

The printer section 2 includes a print face reversing mechanism. Thus, the recording sheet can be carried inward along a carrying path 215 and a carrying path 216 before being discharged, and then can be carried in a reverse direction along a carrying path 217 and a carrying path 214.

The printer section 2 includes a two-sided recording mechanism including a flapper 218 that can guide a recording sheet having passed through the fixing section 212 to a carrying path 219a from the carrying path 215. The recording sheet on the carrying path 219a is then carried in the opposite direction, and the flapper 218 guides the recording sheet to the carrying path 216 and a re-feed carrying path 219b. Next, the recording sheet guided on the re-feed carrying path 219b is carried along the carrying path 210 and fed to the transfer section 209 at the abovementioned timing. The recording sheet discharged from the carrying path 214 can be loaded into a discharge bin 220.

Figure 3:
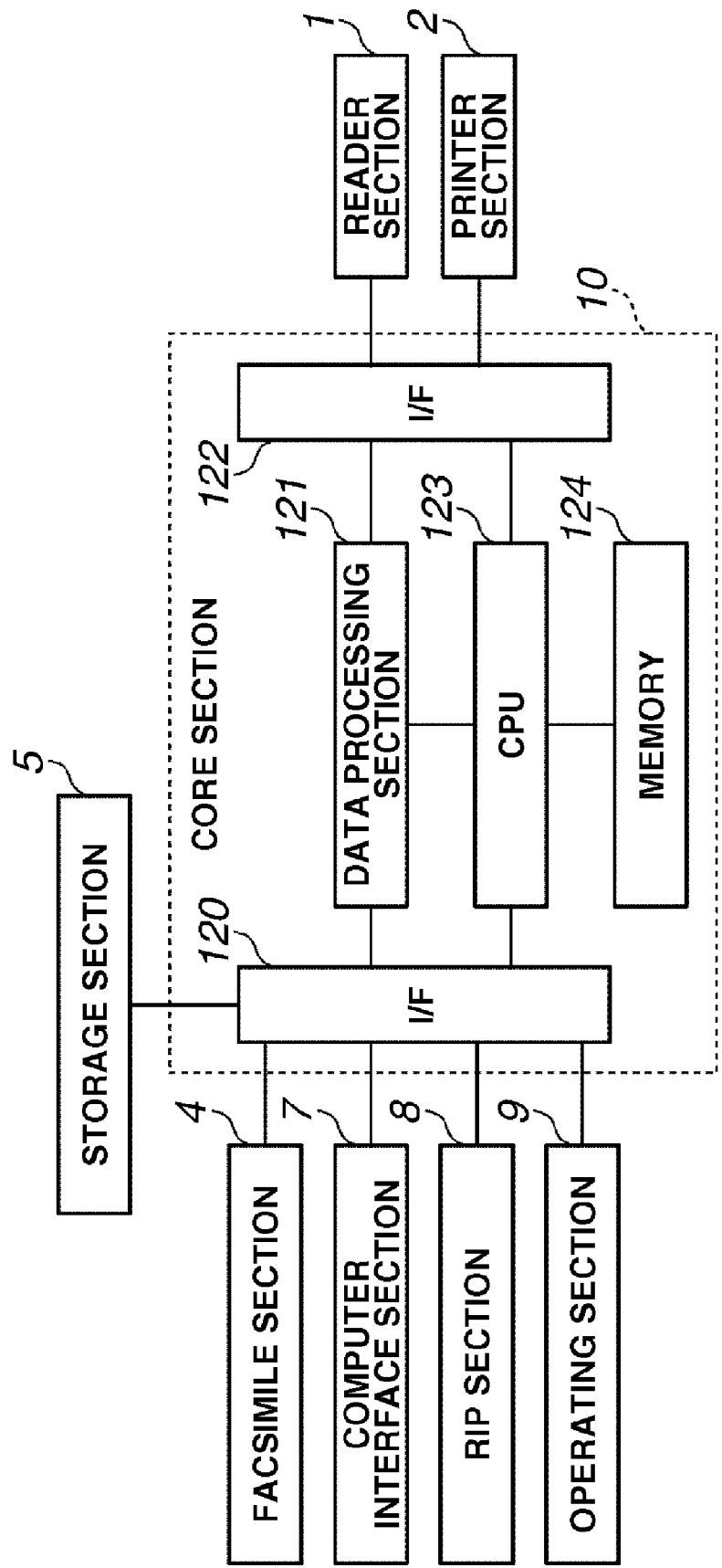
FIG. 3 is a block diagram illustrating a detailed arrangement of a core section of the multifunction peripheral according to the exemplary embodiment of the present embodiment and an exemplary connection between the core section and other sections.

FIG. 3 is a block diagram illustrating a detailed arrangement of the core section 10 of the control section 3 illustrated in FIG. 1 and an exemplary connection between the core section 10 and the reader section 1, the printer section 2, the facsimile section 4, the storage section 5, the computer interface section 7, the RIP section 8, and the operating section 9. The core section 10 includes an interface (I/F) 120, a data processing section 121, an interface (I/F) 122, a central processing section (CPU) 123, and a memory 124.

The reader section 1 transfers image data to the data processing section 121 via the interface 122. The data processing section 121 can apply image processing (e.g., rotation processing and magnification processing) to the received image data. The image data transferred from the reader section 1 to the data processing section 121 can be further transferred via the interface 120 to the storage section 5.

The code data (PDL data), representing an image received via the computer interface section 7, can be transferred to the data processing section 121 via the interface 120. Then, the code data can be transferred to the RIP section 8 and expanded to image data. The image data can be transferred to the data processing section 121 and then transferred to the storage section 5.

Furthermore, the data processing section 121 receives image data from the facsimile section 4 and transfers the received image data to the storage section 5. The data processing section 121 receives image data from the storage section 5 and transfers the received image data to the printer section 2, the facsimile section 4, and the computer interface section 7. CPU 123 can execute the abovementioned controls based on control program(s) stored in the memory 124 and control command(s) transferred from the operating section 9. The memory 124 can be used as a work area for CPU 123.

Figure 4:
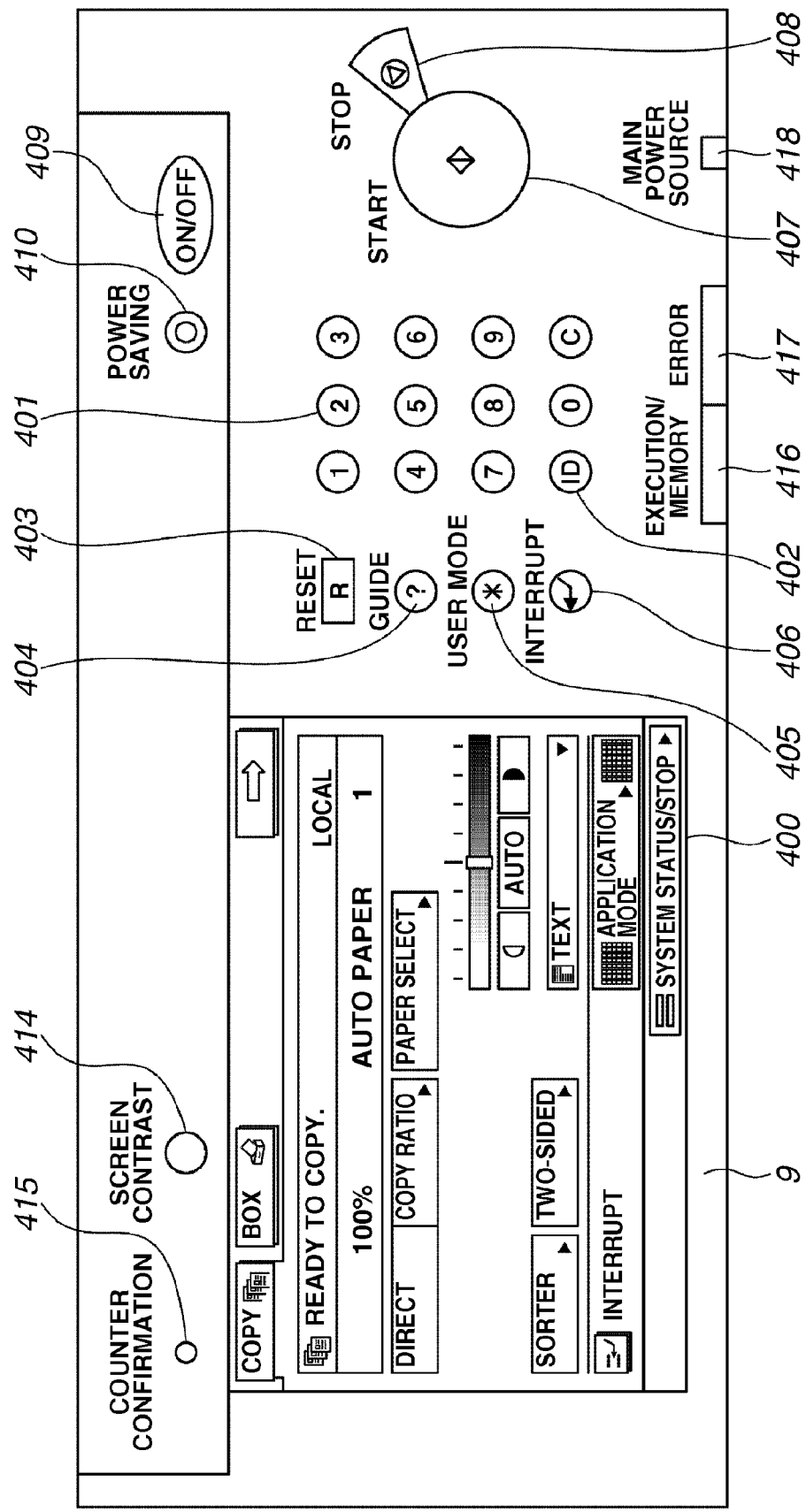
FIG. 4 illustrates an arrangement of an operating section of the multifunction peripheral according to the exemplary embodiment of the present embodiment.

FIG. 4 illustrates the operating section 9. A liquid crystal display (LCD) touch panel 400 enables a user to perform various mode settings and status display. Ten keys 401 enable a user to input numerical values (i.e., 0~9). When administration of the apparatus is performed for each division, a user is required to press an ID key 402 upon completing entry of a division number and password information. Furthermore, a user is required to press ID key 402 when the user performs a log-out action.

A reset key 403 enables a user to reset a mode which is currently set. A guide key 404 enables a user to display a guide screen of each mode. A user mode key 405 enables a user to display a user mode screen. An interrupt key 406 enables a user to perform an interrupt copy.

A start key 407 enables a user to start a copy action. A stop key 408 enables a user to stop the copy job which is currently executed.

When a user presses a soft power source SW 409, the backlight of LCD 400 is turned off and the apparatus can operate in a low-power mode. When a user presses a power saving key 410, the apparatus operates in a power saving mode. When a user presses the power saving key 410 again, the apparatus resumes a normal operation. A screen contrast key 414 enables a user to adjust the contrast of the LCD touch panel. When a user presses a counter confirmation key 415, the LCD displays a count screen showing a total number of copies.

An execution/memory light emitting diode (LED) 416 indicates a job in progress or storage of image into an image memory. An error LED 417 indicates an error state (e.g., paper jam or door-open) of the apparatus. A main power source LED 418 indicates that a main switch of the apparatus is in an ON state.

As described above, the multifunction peripheral according to the present embodiment (i.e., the core section 10 of the control section 3) can execute various processing, including reading a document image via the storage section 5, printing an image, transmitting/receiving an image, storing an image, and inputting/outputting data from/to the computer 11.

Figure 5:
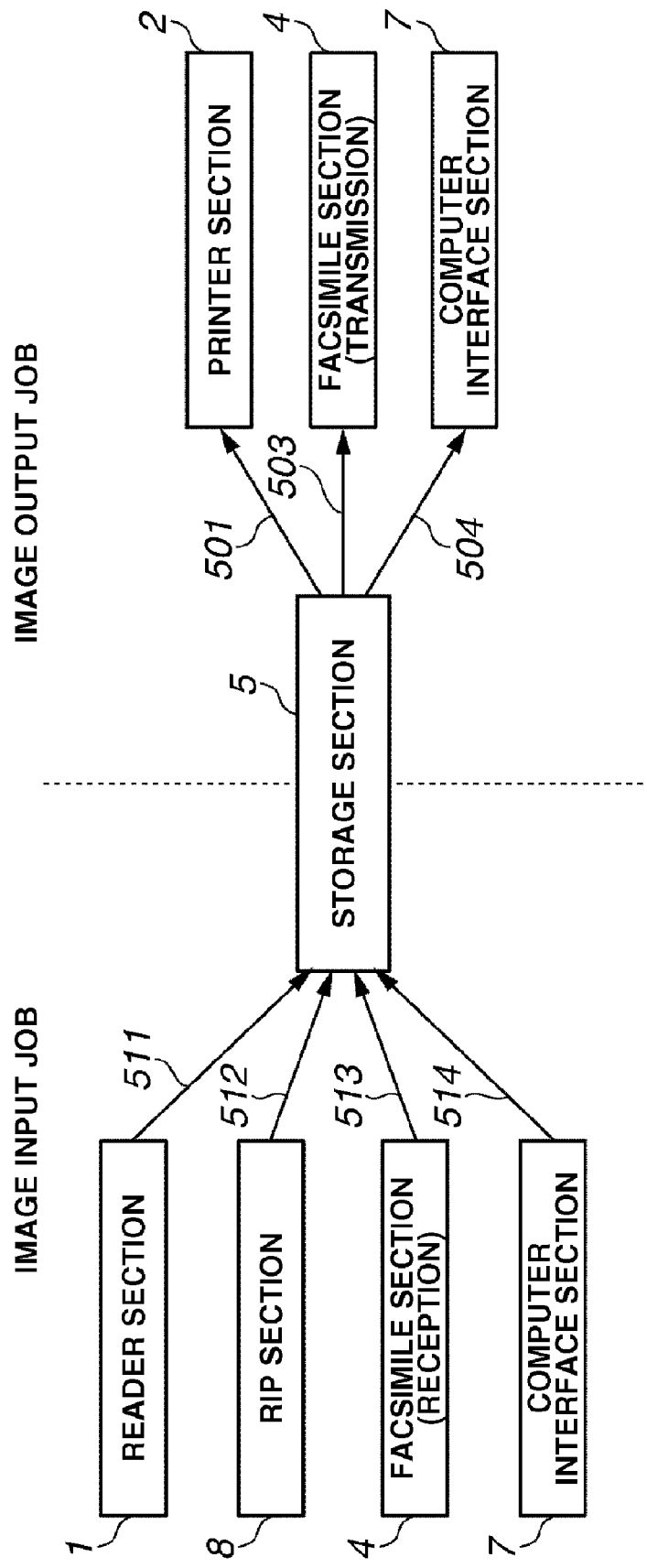
FIG. 5 is a block diagram illustrating exemplary image input and output jobs of the multifunction peripheral according to the exemplary embodiment of the present embodiment.

FIG. 5 illustrates logical blocks representing the job control of the multifunction peripheral according to the present embodiment. According to the example illustrated in FIG. 5, the facsimile section 4 is divided into two blocks (i.e., reception and transmission). Similarly, the computer interface section 7 is divided into two blocks. Each job control block can be regarded as input or output processing applied to a group of image data which may extend on plural pages. Thus, the controlled jobs can be roughly classified into two categories (i.e., an image input job type and an image output job type).

An image input job 511 includes the processing for reading image data by the reader section 1 and successively recording the read image data to the storage section 5. An image input job 512 includes the processing for expanding image data by the RIP section 8 and successively recording the expanded image data to the storage section 5. An image input job 513 includes the processing for receiving image data by the facsimile section 4 and successively recording the received image data to the storage section 5. An image input job 514 includes the processing for receiving image data from the computer interface section 7 and successively recording the received image data to the storage section 5. The image input job 511, the image input job 512, the image input job 513, and the image input job 514 are classified into the image input job type.

An image output job 501 includes the processing for reading image data from the storage section 5 and successively outputting the read image data to the printer section 2. An image output job 503 includes the processing for reading image data from the storage section 5 and successively outputting the read image data to the facsimile section 4. An image output job 504 includes the processing for reading image data from the storage section 5 and successively outputting the read image data to the computer interface section 7. The image output job 501, the image output job 503, and the image output job 504 are classified into the image output job type.

Figure 6:
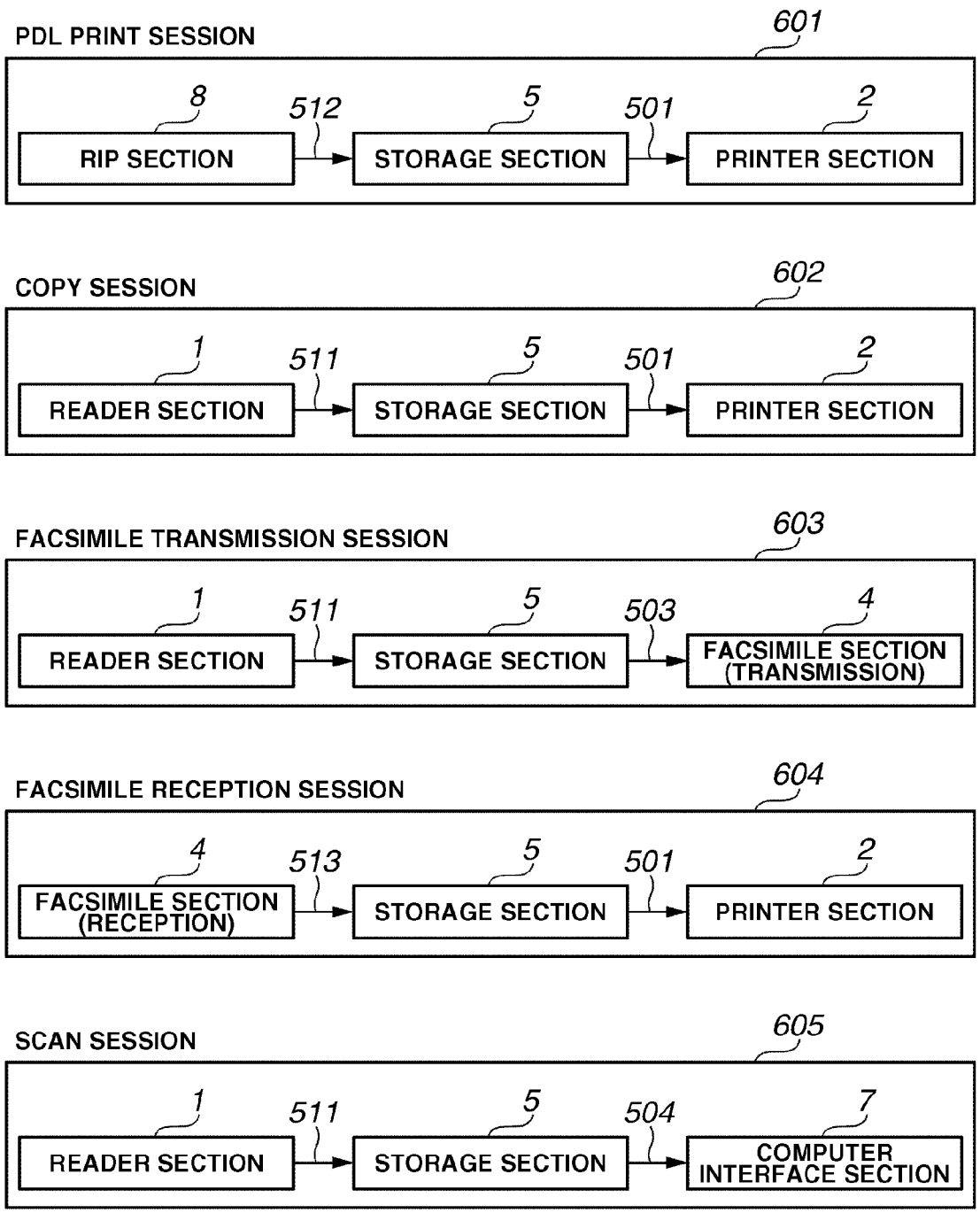
FIG. 6 illustrates exemplary sessions of the multifunction peripheral according to the exemplary embodiment of the present embodiment.

FIG. 6 illustrates exemplary sessions of the multifunction peripheral according to the present embodiment. A PDL print session 601 is a combination of the image input job 512 and the image output job 501 which can be controlled as a session of the multifunction peripheral. A copy session 602 is a combination of the image input job 511 and the image output job 501 which can be controlled as a session of the multifunction peripheral.

A facsimile transmission session 603 is a combination of the image input job 511 and the image output job 503 which can be controlled as a session of the multifunction peripheral. A facsimile reception session 604 is a combination of the image input job 513 and the image output job 501 which can be controlled as a session of the multifunction peripheral. A scan session 605 is a combination of the image input job 511 and the image output job 504 which can be controlled as a session of the multifunction peripheral.

A session includes one or more jobs. For example, the image input job 512 can form a single session. The image output job 501 can form a single session. The image input job 512, the image output job 501, and the image output job 503 can also be combined to form a single session.

Figure 7:
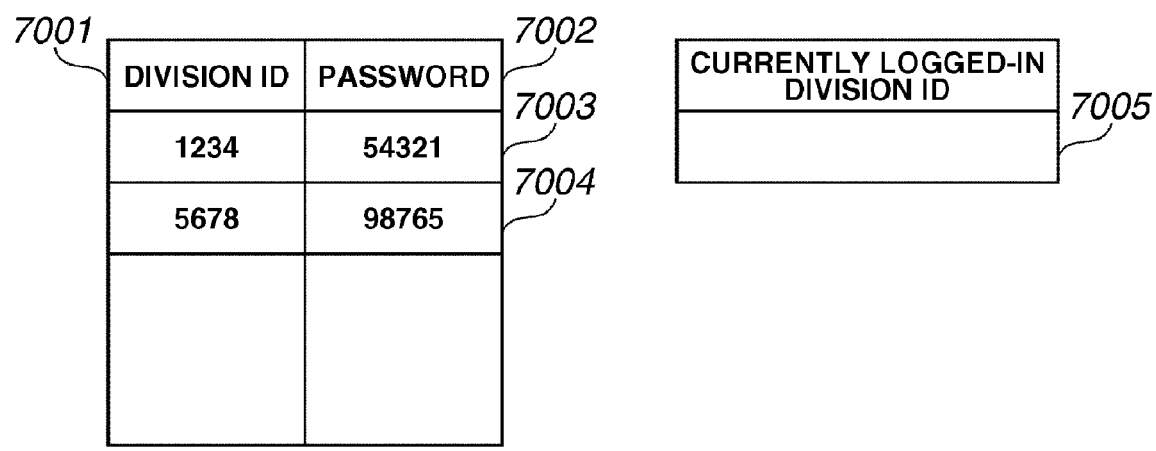
FIG. 7 illustrates an exemplary division administration table and an exemplary log-in division ID table stored in a memory of the core section, which are used in the multifunction peripheral according to the exemplary embodiment of the present embodiment.

FIG. 7 illustrates an exemplary division administration table and an exemplary log-in division ID table stored in the memory 124 of the core section 10, which are used in the multifunction peripheral according to the present embodiment.

The multifunction peripheral according to the present embodiment requires entry of a division ID and a password when a user manipulates the machine. When the multifunction peripheral determines that the entered division ID and the password are correct, the multifunction peripheral approves a log-in action to get access to the multifunction peripheral. Thus, a user can use the multifunction peripheral. According to the present embodiment, both a division ID and a password are required to approve a log-in action. However, the division ID can be replaced with a user ID or any other user information that can identify a user having logged-in the multifunction peripheral.

The division administration table includes division ID 7001 and password information 7002 as a pair of user data. The division administration illustrated in FIG. 7 stores a record 7003 with a division ID equal to "1234" and a password equal to "54321" and another record 7004 with a division ID equal to "5678" and a password equal to "98765." These records can be registered beforehand by a system administrator. The system administrator can arbitrarily register a plurality of records.

A storage format of the password can be a plain text or a hash value. To prevent the information from being erased from the division administration table when no power is supplied, it is useful to store the division administration table to a nonvolatile memory area of the memory 124 of the core section 10 or in the storage section 5.

Alternatively, the division administration table can be stored in an external information processing apparatus and can be loaded into the memory 124 of the core section 10 only when authentication of the division ID and password information is required.

Furthermore, an information processing apparatus capable of authenticating a log-in action for operating the multifunction peripheral can be separately provided. In this case, the multifunction peripheral can transmit a division ID and a password to the information processing apparatus and receive authentication result from the information processing apparatus.

A currently logged-in division ID table 7005 stores a division ID of a user having logged-in the image processing apparatus when a user inputs the division ID with the LCD touch panel 400, the ten keys 401, and the ID key 402 of the operating section 9. When no user is manipulating the image processing apparatus, the log-in division ID table 7005 stores no information. If there is any user having currently logged-in the image processing apparatus, the division ID of the user is stored in the table 7005. For example, the log-in division ID table 7005 stores "1234" when a log-in user belongs to the division corresponding to a division ID "1234" (refer to record 7003 in the division administration table).

Figure 8:
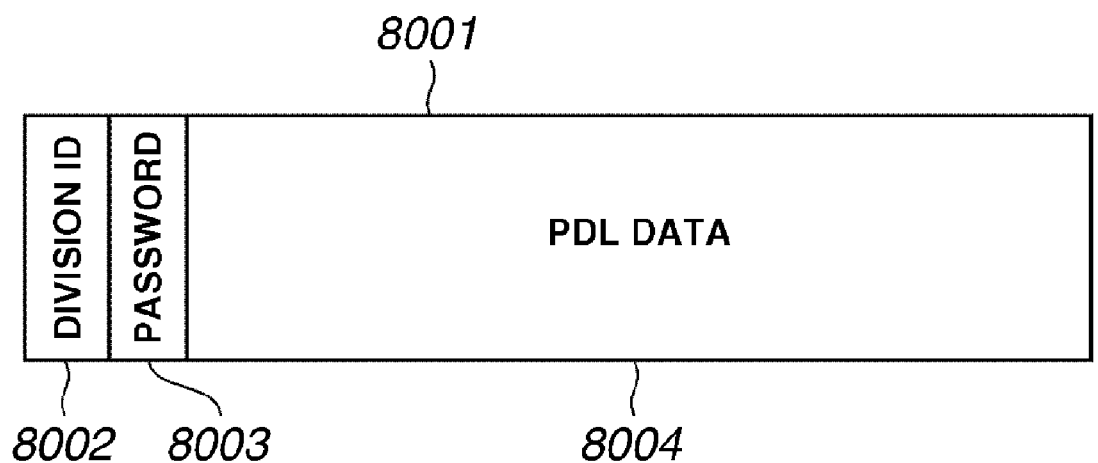
FIG. 8 illustrates an exemplary configuration of page description language (PDL) data that a computer interface section of the multifunction peripheral can receive from a computer according to the exemplary embodiment of the present embodiment.

FIG. 8 illustrates an exemplary configuration of print data that the computer interface section 7 of the multifunction peripheral can receive from the computer 11 according to the present embodiment.

The print data 8001 transmitted from the computer 11 includes an area 8002 storing a division ID and an area 8003 storing password information received from the computer 11, as well as an area 8004 storing PDL data (i.e., data to be actually printed). When the print data illustrated in FIG. 8 is received, the multifunction peripheral registers the division ID described in the area 8002 to the log-in division ID table 7005 illustrated in FIG. 7 before executing print processing of the print data. Please note that any other type of data that would enable practice of the present invention can be included in area 8004.

Next, log-in processing and print processing of the multifunction peripheral according to the present embodiment will be described with reference to flowcharts illustrated in FIGS. 9 and 10.

Figure 9:
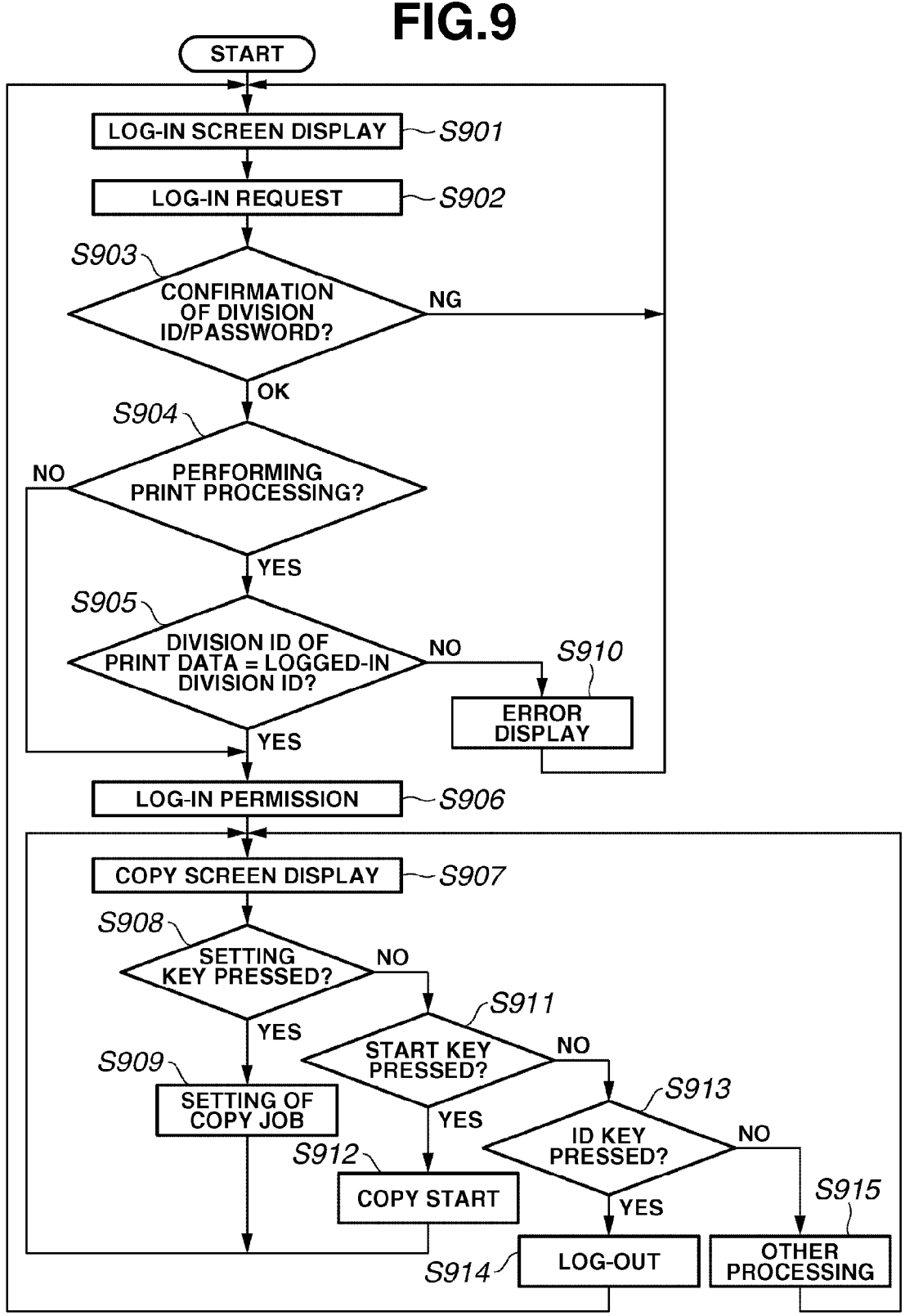
FIG. 9 is a flowchart illustrating an exemplary action of the multifunction peripheral according to the exemplary embodiment of the present embodiment.

FIG. 9 is a flowchart illustrating an exemplary action performed by the multifunction peripheral according to the present embodiment, including a user's log-in action for the multifunction peripheral, causing the multifunction peripheral to execute predetermined processing, and a user's log-out action.

Figure 11:
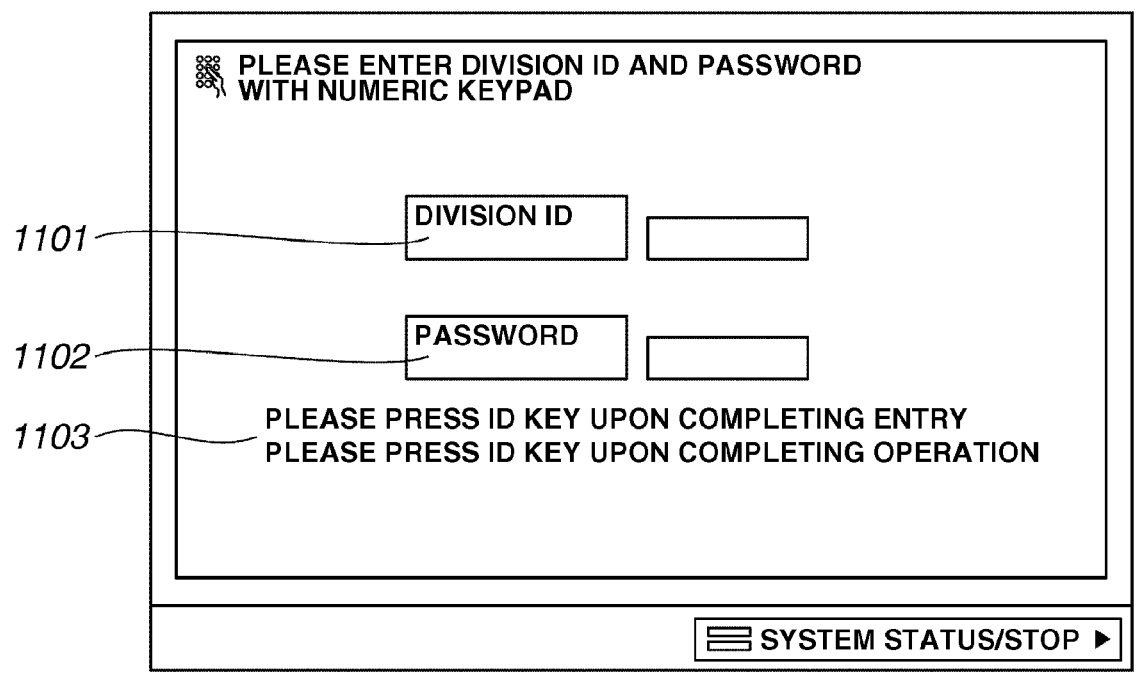
FIG. 11 illustrates an exemplary log-in screen displayed on the operating section of the multifunction peripheral according to the exemplary embodiment of the present embodiment.

First, in step S901, a log-in screen is displayed on the LCD touch panel 400 provided in the operating section 9 of the multifunction peripheral. FIG. 11 illustrates an exemplary log-in screen displayed in step S901. The log-in screen includes a division ID button 1101 that enables a user to select an input item with respect to the division ID and a password information button 1102 that enables a user to select an input item with respect to the password.

When a user selects buttons 1101 and 1102, the multifunction peripheral can receive each input. After a user selects the division ID button 1101 or the password information button 1102, the user can input a division ID and password information with ten keys 401 on the operating section 9.

A guide message 1103, such as "Please press ID key upon completing entry" or "Please press ID key upon completing operation", requires a user to press the ID key 402 for a log-in action after inputting a division ID and password information. Similarly, a user is required to press the ID key 402 for a log-out action.

Returning to FIG. 9, in step S902, the core section 10 receives a log-in request. More specifically, if the ID key 402 is pressed in a state where both a division ID and a password have been entered, the core section 10 recognizes a log-in request and obtains the entered division ID and password information.

In step S903, the core section 10 executes authentication processing for the division ID and the password obtained in step S902. More specifically, the core section 10 compares the obtained division ID and the password with information on the division administration table (refer to FIG. 7) stored in the memory 124 or the storage section 5. The core section 10 determines whether the obtained division ID and the password are registered in the division administration table based on a comparison result.

If authentication is approved (i.e., OK in step S903), i.e., when the core section 10 determines that the division ID and the password obtained in step S902 are registered in the division administration table, the processing flow proceeds to step S904. On the other hand, if authentication is denied, the processing flow returns to step S901 to display the log-in screen.

In step S904, the core section 10 determines whether the printer section 2 is performing print processing. If the core section 10 determines that the printer section 2 is performing print processing (i.e., YES in step S904), the processing flow proceeds to step S905. Otherwise (i.e., NO in step S904), the processing flow proceeds to step S906.

In step S905, the core section 10 determines whether a division ID contained in print data being currently printed is equal to the log-in requested division ID. More specifically, the core section 10 compares a division ID registered in the log-in division ID table stored in the memory 124 or the storage section 5 with the division ID obtained in step S902. The core section 10 determines whether the division ID of the print data is equal to the log-in requested division ID based on a comparison result.

If the core section 10 determines that compared division IDs are identical to each other (i.e., YES in step S905), the processing flow proceeds to step S906. Otherwise (i.e., NO in step S905), the processing flow proceeds to step S910.

In step S906, the core section 10 approves a log-in action corresponding to the log-in request received in step S902. On the other hand, in step S910, the core section 10 performs a predetermined error display on the touch panel of the operating section 9, and does not approve the log-in action.

As apparent from the above description, the multifunction peripheral according to the present embodiment determines whether there is any print processing currently performed in response to reception of a log-in request. If no print processing is currently performed, the multifunction peripheral approves the log-in action. If there is print processing currently performed, the multifunction peripheral compares a division ID of the print job with a division ID of the log-in request. When the compared division IDs are identical to each other, the multifunction peripheral approves the log-in action. If the compared division IDs are different from each other, the multifunction peripheral refuses the log-in action.

Thus, the multifunction peripheral according to the present embodiment can prevent the output result of a processed print job from being seen and known by a user other than the user having requested the print processing (i.e., a user having a different division ID). Moreover, when the multifunction peripheral is simultaneously operated by a plurality of users having different division IDs, the present embodiment can prevent output products of a plurality of users from being mixed.

Returning to FIG. 9, in step S906, after the log-in action is approved, the core section 10 determines whether the division ID is registered in the log-in division ID table. If the division ID is not registered in the log-in division ID table, the core section 10 registers the division ID obtained in step S902, as a part of the proceeding of step S906. Then, the processing flow proceeds to step S907. In step S907, the core section 10 displays a default setting screen of the multifunction peripheral.

Figure 12:
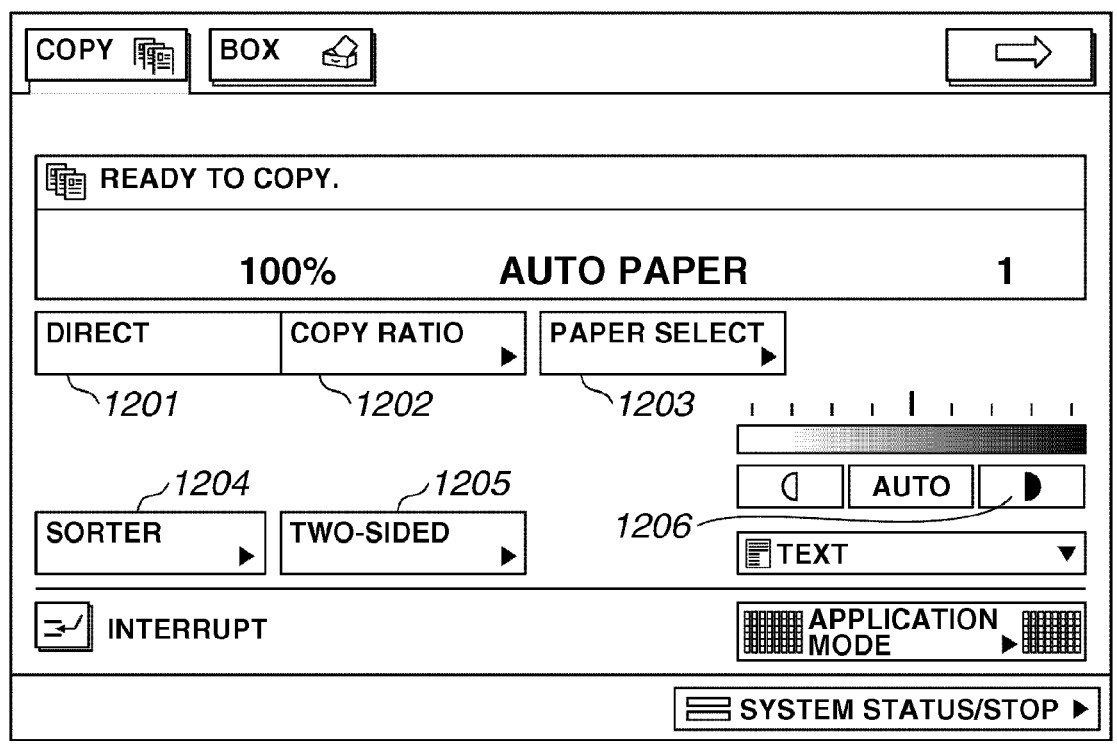
FIG. 12 illustrates an exemplary screen displayed on the operating section of the multifunction peripheral according to the exemplary embodiment of the present embodiment.

FIG. 12 illustrates an exemplary screen displayed on the touch panel 400 of the operating section 9. The example illustrated FIG. 12 is a copy setting screen serving as the default setting screen of the multifunction peripheral. However, the default setting screen of the multifunction peripheral can be a facsimile setting screen or other setting screen.

The copy setting screen includes various buttons prepared for various settings relating to a copy job. A 1:1 button 1201 enables a user to return a copy ratio being previously set to a 1:1 copy ratio (i.e., 100%). A copy ratio button 1202 enables a user to set a desired copy ratio (e.g., enlargement from A4 to A3 or reduction from A3 to A4). A paper selection button 1203 enables a user to select a desired sheet feeding tray (i.e., a desired sheet size).

A sorter button 1204 enables a user to set post-processing for a bundle of output sheets, such as shift sort, staple sort, etc. A two-sided button 1205 enables a user to select a two-sided reading of a document by the reader section 1 or a two-sided printing of a sheet by the printer section 2. A concentration button 1206 enables a user to select a desired print concentration. By selecting these buttons, a user can accomplish settings for a copy job.

Figure 13:
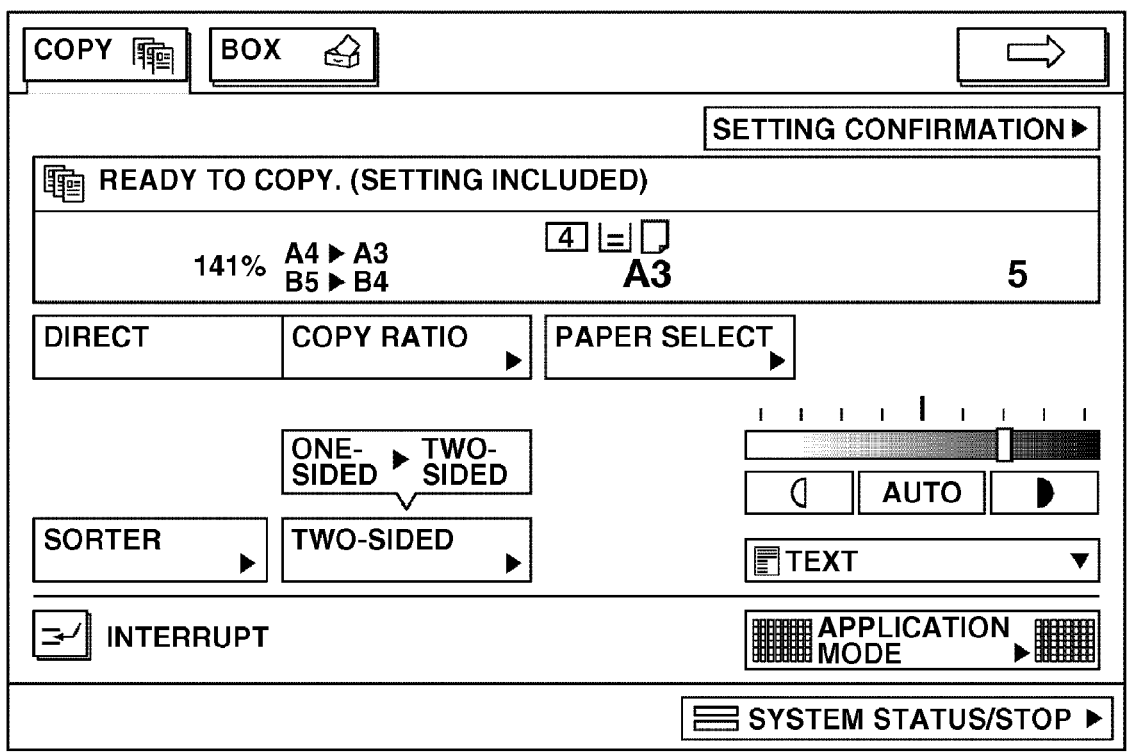
FIG. 13 illustrates an exemplary screen displayed on the operating section of the multifunction peripheral according to the exemplary embodiment of the present embodiment.

Returning to FIG. 9, in step S908, the core section 10 determines whether the copy setting buttons illustrated in FIG. 12 have been selected by a user. If the core section 10 determines that the copy setting buttons have been selected (i.e., YES in step S908), the processing flow proceeds to step S909. In step S909, the core section 10 executes predetermined settings corresponding to the selected buttons and switches the display screen. FIG. 13 illustrates an exemplary display screen of the touch panel 400 that shows various settings for a copy job.

If the core section 10 determines that the copy setting buttons have not been selected (i.e., NO in step S908), the processing flow proceeds to step S911. In step S911, the core section 10 determines whether the start key 407 has been pressed. If the start key 407 has been pressed (i.e., YES in step S911), the processing flow proceeds to step S912 to start copy processing. On the other hand, when the start key 407 has not been pressed (i.e., NO in step 911), the processing flow proceeds to step S913. In step S913, the core section 10 determines whether the ID key 402 has been pressed. If the core section 10 determines that the ID key 402 has been pressed (i.e., YES in step 913), the processing flow proceeds to step S914.

In step S914, the core section 10 executes log-out processing. More specifically, the core section 10 determines whether the printer section 2 is currently executing print processing. If the core section 10 determines that the printer section 2 is not currently executing print processing, the core section 10 deletes the division ID from the log-in division ID table 7005. Then, the processing flow returns to step S901 to display the log-in screen.

If the core section 10 determines that the ID key 402 has not been pressed (i.e., NO in step 913), the processing flow proceeds to step S915 to execute other processing. Then, the processing flow returns to step S907.

The multifunction peripheral according to the present embodiment performs the abovementioned sequential actions including a log-in action to a log-out action.

Figure 10:
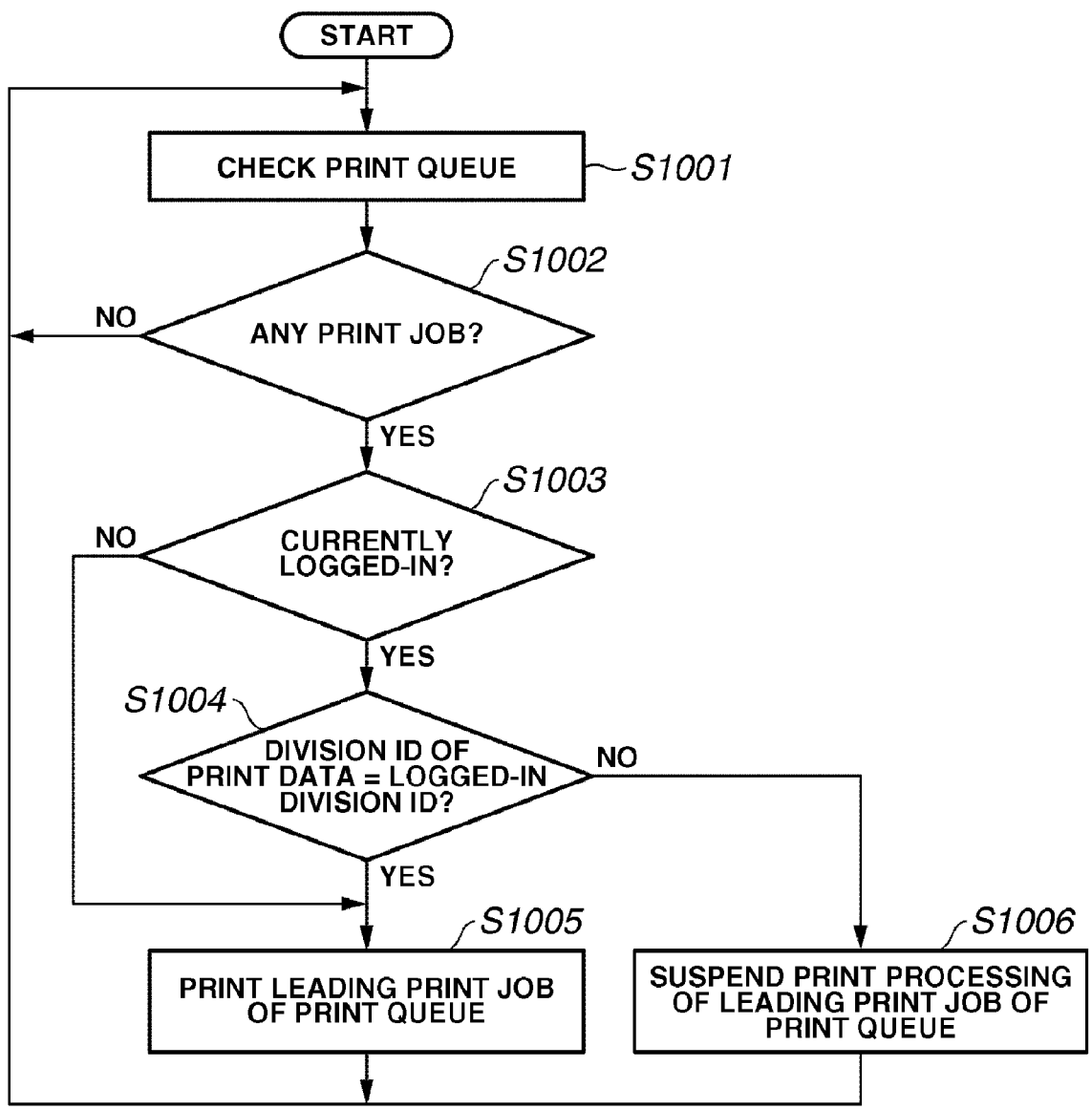
FIG. 10 is a flowchart illustrating an exemplary action of the multifunction peripheral according to the exemplary embodiment of the present embodiment.

FIG. 10 is a flowchart illustrating exemplary action performed by the multifunction peripheral according to the present embodiment for print processing image data received from an external apparatus (e.g., a computer or a facsimile apparatus) or from the reader section 1.

First, in step S1001, the core section 10 checks a print queue in the memory 124 or the storage section 5. Then, in step S1002, the core section 10 determines whether any print job is present in the print queue. If a print job is present (i.e., YES in step S1002), the processing flow proceeds to step S1003. If no print job is present (i.e., NO in step S1002), the processing flow returns to step S1001.

In step S1003, the core section 10 determines whether there is any user currently logged-in on the multifunction peripheral. More specifically, the core section 10 refers to the log-in division ID table stored in the memory 124 or the storage section 5 and determines whether any division ID is registered. If a division ID is registered in the log-in division ID table, a user corresponding to the division ID is equal to the currently logged-in user. On the other hand, if no division ID is registered in the log-in division ID table, no user is currently logged-in on the multifunction peripheral.

If the core section 10 determines that there is a user currently logged-in on the multifunction peripheral (i.e., YES in step S1003), the processing flow proceeds to step S1004. In step S1004, the core section 10 determines whether a user currently logged-in the multifunction peripheral is identical to a user of a leading print job of the print queue. More specifically, the core section 10 refers to a division ID registered in the log-in division ID table and identifies a logged-in user. In other words, the core section 10 can identify a logged-in user as a user of a division corresponding to the division ID registered on the log-in division ID table.

Then, the core section 10 refers to the division ID (i.e., 8002 illustrated in FIG. 8) contained in the leading print job of the print queue and identifies a user corresponding to the print job. Then, the core section 10 compares the division ID registered in the log-in division ID table with the division ID contained in the print job. The core section 10 determines whether the logged-in user is identical to the user corresponding to the print job based on the comparison.

If the core section 10 determines that the compared division IDs are identical with each other, i.e., when the logged-in user is identical to the user corresponding to the print job (YES in step S1004), the processing flow proceeds to step S1005. Otherwise (i.e., NO in step S1004), the processing flow proceeds to step S1006. Furthermore, when the core section 10 determines that there is no user currently logged onto the multifunction peripheral (i.e., NO in step S1003), the processing flow proceeds to step S1005.

In step S1005, the core section 10 sends a leading print job of the print queue to the printer section 2 and causes the printer section 2 to execute print processing. In this case, if no division ID is registered in the log-in division ID table, the core section 10 registers a division ID contained in the currently processed print job to the log-in division ID table.

In step S1006, the core section 10 suspends print processing of the leading print job of the print queue. To this end, the core section 10 shifts the leading print job to the bottom of the print queue. In other words, the core section 10 prevents the determination processing from being repeatedly performed based on the same print job when determination about a leading job of the print queue is made next time.

More specifically, when the multifunction peripheral executes print processing according to the present embodiment, the multifunction peripheral determines whether there is any logged-in user (i.e., a user currently logged-in on the multifunction peripheral). If no user is logged-in, the multifunction peripheral executes print processing. If a user is logged-in, the multifunction peripheral compares a division ID corresponding to the logged-in user with a division ID of a print job to be executed. If the compared IDs are identical to each other, the multifunction peripheral executes the print processing. If the compared IDs are different from each other, the multifunction peripheral suspends the print processing.

Through the above-described processing, the present embodiment can prevent the printing result of a print job output from the multifunction peripheral from being seen by a user other than the user requesting the print processing (i.e., a user having a different division ID).

Furthermore, the present embodiment allows a logged-in user (i.e., a user currently logged-in on the multifunction peripheral) to easily execute operations for the print processing without being interrupted by another user (i.e., a user having a different division ID). Moreover, the present embodiment can prevent a user from seeing or taking the printed sheets of other users.

The multifunction peripheral according to the present embodiment can simultaneously execute the process described with reference to the flowchart illustrated in FIG. 9 and the process described with reference to the flowchart illustrated in FIG. 10.

Figure 14:
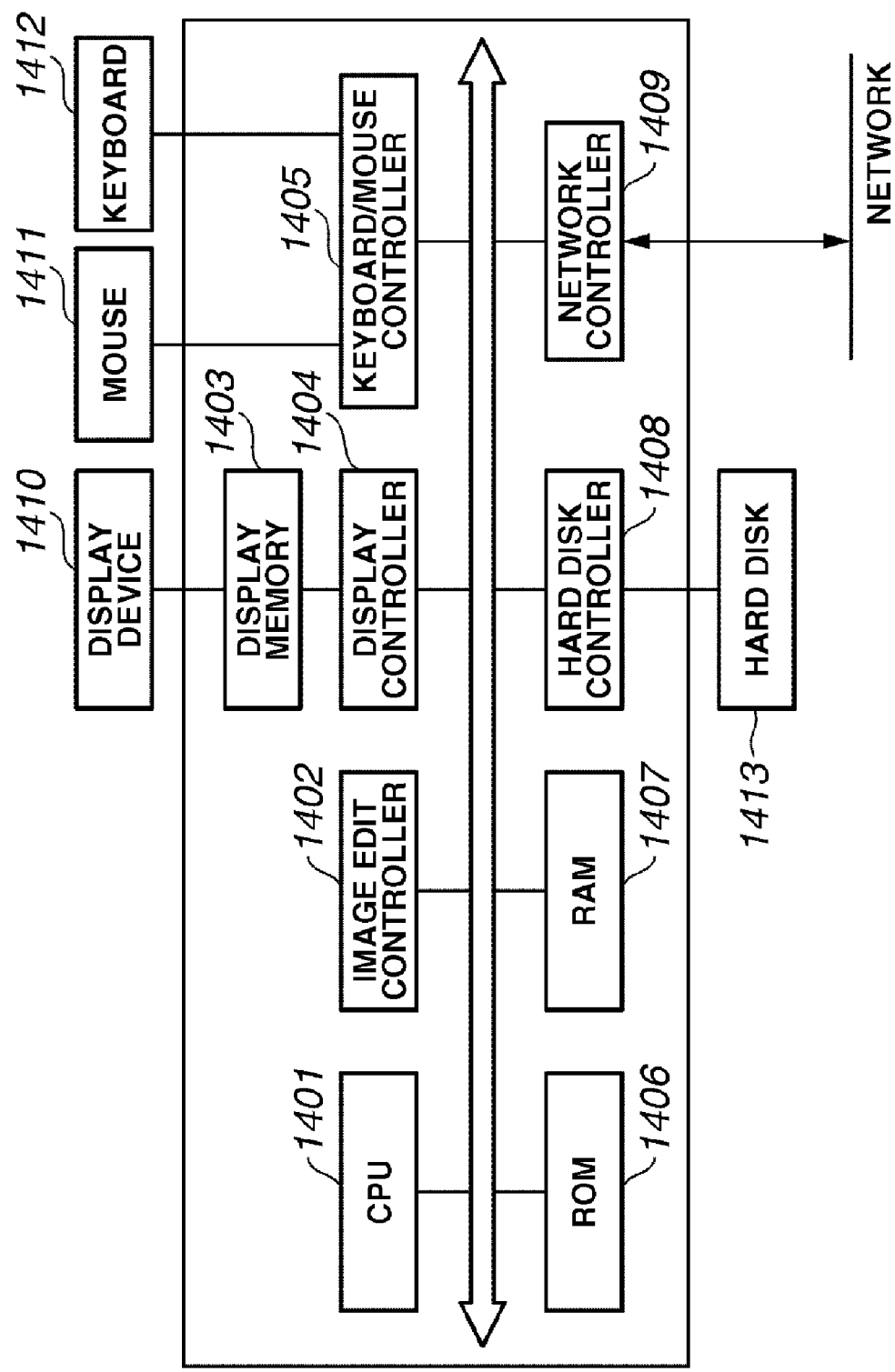
FIG. 14 is a block diagram illustrating an exemplary arrangement of a computer according to the exemplary embodiment of the present embodiment.

Next, an exemplary arrangement of the computer 11 according to the present embodiment is described below. FIG. 14 is a block diagram illustrating an internal arrangement of the computer 11 connected to a network.

CPU 1401 executes a program stored in ROM 1406 or the hard disk 1413 and loaded into RAM 1407. A network controller 1409 controls a protocol on the network and controls transmission/reception of data between the computer 11 and the network. A hard disk 1413 is a mass storage device capable of storing predetermined programs and various data including image data. A hard disk controller 1408 controls the hard disk 1413.

A mouse 1411 and a keyboard 1412 enable a user to input instructions and information/data. A keyboard/mouse controller 1405 controls the mouse 1411 and the keyboard 1412. A display device 1410 displays an edit menu. A display controller 1404 controls the display device 1410. An image edit controller 1402 executes image layout and edit processing on a display memory 1403.

The computer 11 can generate data using a predetermined application stored in the hard disk 1413 or ROM 1406 and can convert the generated data into print data using a printer driver. The computer 11 transmits the data to the multifunction peripheral via the network controller 1409.

Figure 15:
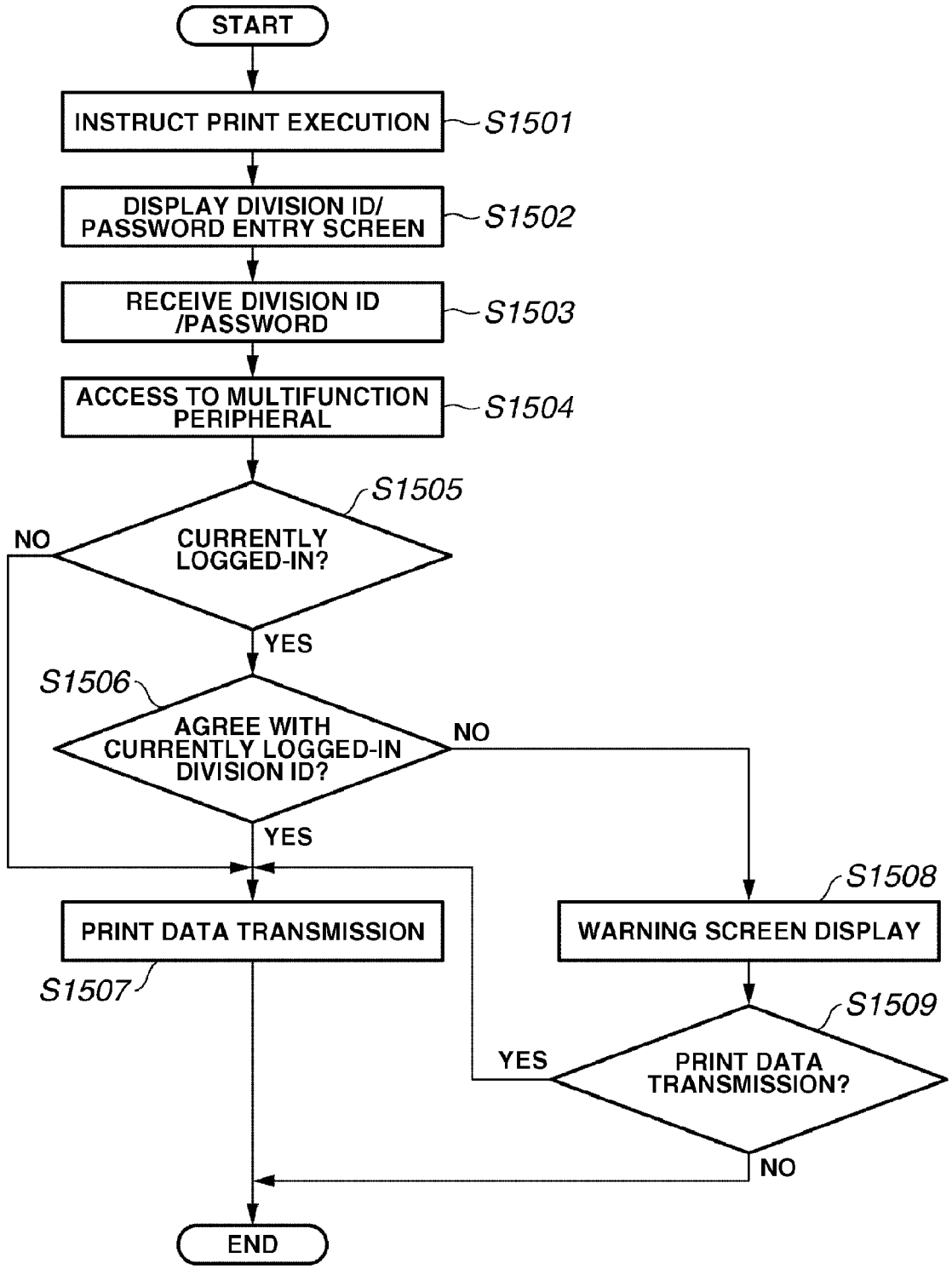
FIG. 15 is a flowchart illustrating an exemplary action of the computer according to the exemplary embodiment of the present embodiment.

FIG. 15 is a flowchart illustrating print data transmission processing performed by the computer 11. In step S1501, CPU 1401 receives a print execution instruction. FIG. 16 illustrates an exemplary print instruction screen displayed on the display device 1410 of the computer 11. A user can select, on the screen, a desired printing apparatus (i.e., output destination) of the print data and input print settings. A user selects an OK button 1601 upon finishing entry of the print instruction. In the determination of step S1501, CPU 1401 can check whether the OK button 1601 has been selected.

Figure 17:
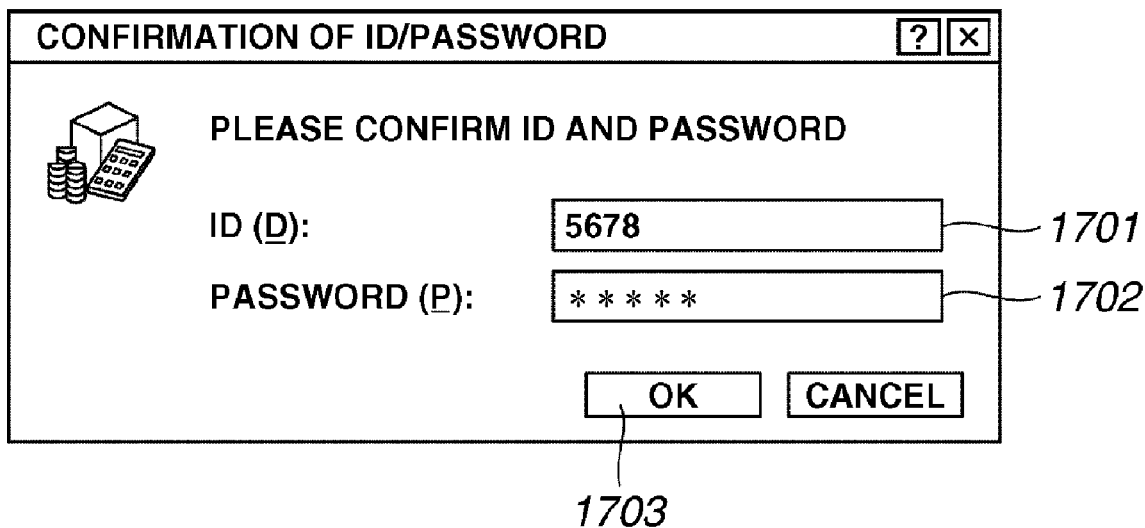
FIG. 17 illustrates an exemplary screen displayed on the display device of the computer according to the exemplary embodiment of the present embodiment.

In step S1502, the display controller 1404 causes the display device 1410 to display a division ID/password entry screen. FIG. 17 illustrates an exemplary division ID/password entry screen displayed on the display device 1410 in step S1502. A user can input, with the keyboard 1412, a division ID to a division ID entry field 1701 and a password to a password entry field 1702 provided on the screen. Then, a user selects an OK button 1703. In step S1503, if the OK button 1703 has been selected on the screen illustrated in FIG. 17, CPU 1401 receives the division ID and the password entered in step S1502.

Next, in step S1504, the computer 11 accesses the printing apparatus (i.e., output destination) selected on the screen illustrated in FIG. 16. In the present embodiment, the computer 11 accesses the selected multifunction peripheral (i.e., output destination of print data) via the network controller 1409. The computer obtains, via the network controller 1409, information on the log-in division ID table of the multifunction peripheral. If no division ID is registered on the log-in division ID table of the multifunction peripheral, the computer obtains information indicating no registration of division ID. If any division ID is registered, the computer obtains the information relating to the registered division ID.

In step S1505, CPU 1401 determines whether there is any user currently logged-in on the multifunction peripheral based on the information obtained step S1504. More specifically, CPU 1401 determines that there is no user is logged in if no division ID has been obtained in step S1504. On the other hand, CPU 1401 determines that there is a user logged in if any division ID has been obtained in step S1504. If CPU 1401 determines that a user is logged in (i.e., YES in step S1505), the processing flow proceeds to step S1506. Otherwise (i.e., NO in step S1505), the processing flow proceeds to step S1507.

In step S1506, CPU 1401 determines whether the division ID obtained in step S1503 is equal to the division ID obtained in step S1504. If CPU 1401 determines that the division ID obtained in step S1503 is equal to the division ID obtained in step S1504 (i.e., YES in step S1506), the processing flow proceeds to step S1507. Otherwise (i.e., NO in step S1506), the processing flow proceeds to step S1508.

Figure 18:
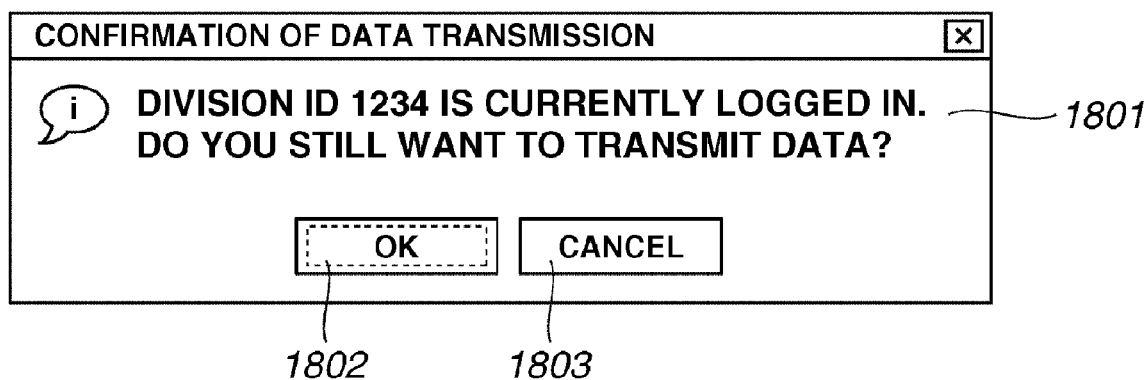
FIG. 18 illustrates an exemplary warning screen displayed on the display device of the computer according to the exemplary embodiment of the present embodiment.

In step S1508, the display controller 1404 causes the display device 1410 to display a warning screen that indicates the presence of a user currently logged in on the multifunction peripheral. FIG. 18 illustrates an exemplary warning screen displayed on the display device 1410 in step S1508. The warning screen displays information 1801 indicating the division ID currently logged in on the multifunction peripheral, and provides a user with the choice of either executing or cancelling a requested print job.

In step S1509, CPU 1401 determines whether transmission of print data can be executed. More specifically, if CPU 1401 detects that a user has selected the OK button 1802 on the screen illustrated in FIG. 18, CPU 1401 determines that the user requests transmission of print data. If CPU 1401 detects that a user has selected a cancel button 1803 on the screen illustrated in FIG. 18, CPU 1401 determines that the user has requested no transmission of print data.

In step S1507, CPU 1401 generates print data including the division ID and the password obtained in step S1503 (i.e., print data illustrated in FIG. 8) and the network controller 1409 transmits the generated print data to the multifunction peripheral.

As illustrated in the flowchart of FIG. 15, the computer 11 according to the present embodiment determines whether there is any user logged in (i.e., a user currently logged in on the multifunction peripheral) before transmitting print data to the multifunction peripheral. If there is no user logged in, the computer 11 transmits the print data. If there is a user logged in, the computer 11 compares a division ID corresponding to the logged in user with a division ID of the print data. If the compared IDs are identical to each other, the computer 11 transmits the print data. Otherwise, the computer 11 displays a warning screen.

As the warning screen displays the division ID of the logged in user, a user intending to transmit print data can confirm the logged in user on the warning screen beforehand and can select execution or cancellation of data transmission. Therefore, before print data is transmitted from the computer 11 to the multifunction peripheral, a user intending to transmit the print data is aware if a user is currently logged in on the multifunction peripheral and can determine whether transmission of print data should be executed.

As described above, the present invention does not execute print processing if another user is currently logged in on a printing apparatus when print data is received. Furthermore, the present invention inhibits a log-in action of other users when the printing apparatus is currently executing print processing. Therefore, the present invention can efficiently execute print processing. Furthermore, the present invention can inform a user operating an information processing apparatus to which print data is transmitted, about a user currently logged in on the printing apparatus. Thus, the present invention can efficiently execute the print processing.

The present invention can be applied to a system including a plurality of devices or can be applied to a single apparatus. For example, an administration apparatus can be separately provided to administrate division IDs and passwords of log-in users and to execute authentication processing.

Furthermore, software program code for realizing the functions of the above-described exemplary embodiments (refer to flowcharts illustrated in FIGS. 9, 10, and 15) can be supplied to a system or an apparatus. A computer (or CPU or micro-processing unit (MPU)) in the system or the apparatus can execute the program to realize the functions of the above-described exemplary embodiments. Accordingly, the present invention encompasses the program code installable in a computer when the functions or processes of the exemplary embodiments can be realized by the computer.

In this case, the program code itself can realize the functions of the exemplary embodiments. The equivalents of programs can be used if they possess comparable functions. Furthermore, the present invention encompasses supplying the program code to a computer with a storage (or recording) medium storing the program code.

In this case, the type of program can be any one of object code, interpreter program, and OS script data. A storage medium supplying the program can be selected from any one of a floppy disk, a hard disk, an optical disk, a magneto-optical (MO) disk, a compact disk—ROM (CD-ROM), a CD-recordable (CD-R), a CD-rewritable (CD-RW), a magnetic tape, a nonvolatile memory card, a ROM, and a DVD (DVD-ROM, DVD-R).

The method for supplying the program includes accessing a web site on the Internet using the browsing function of a client computer, when the web site allows each user to download the computer program of the present invention, or compressed files of the programs having automatic installing functions, to a hard disk or other recording medium of the user.

Furthermore, the program code constituting the programs of the present invention can be divided into a plurality of files so that respective files are downloadable from different web sites. Namely, the present invention encompasses WWW servers that allow numerous users to download the program files so that the functions or processes of the present invention can be realized on their computers.

Next, enciphering the programs of the present invention and storing the enciphered programs on a CD-ROM or comparable recording medium is an exemplary method when the programs of the present invention are distributed to the users. The authorized users (i.e., users satisfying predetermined conditions) are allowed to download key information from a page on the Internet. The users can decipher the programs with the obtained key information and can install the programs on their computers. When the computer reads and executes the installed programs, the functions of the above-described exemplary embodiments can be realized.

Moreover, an operating system (OS) or other application software running on the computer can execute part or all of the actual processing based on instructions of the programs. Additionally, the program code read out of a storage medium can be written into a memory of a function expansion board equipped in a computer or into a memory of a function expansion unit connected to the computer. In this case, based on an instruction of the program, a CPU provided on the function expansion board or the function expansion unit can execute part or all of the processing so that the functions of the above-described exemplary embodiments can be realized.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures, and functions.

This application claims priority from Japanese Patent Application No. 2006-085566 filed Mar. 27, 2006, which is hereby incorporated by reference herein in its entirety.

What is claimed is:

1. A printing apparatus comprising:
a reception unit configured to receive print data;
an identification unit configured to identify user information contained in the received print data;
a judgment unit configured to judge whether a user, who corresponds to user information which is different from the user information identified by the identification unit, has been logged on the printing apparatus;
a printing unit configured to, if the judgment unit determines that the user, who corresponds to the user information which is different from the user information identified by the identification unit, has not been logged on the printing apparatus, print the received print data, and, if the judgment unit determines that the user, who corresponds to the user information which is different from the user information identified by the identification unit, has been logged on the printing apparatus, print the received print data in response to logout of the user from the printing apparatus; and
a control unit configured to permit logon of a user who corresponds to the user information contained in the received print data and to inhibit logon of a user different from the user corresponding to the user information contained in the received print data, in a case where a request for logging on the printing apparatus is received during printing of the received print data by the printing unit.

2. A printing apparatus comprising:
a reception unit configured to receive print data;
a first identification unit configured to identify user information contained in the received print data;
a first determination unit configured to determine whether there is any user currently logged on the printing apparatus;
a second identification unit configured to identify user information corresponding to a currently logged on user when the first determination unit determines that the user is currently logged on the printing apparatus;
a second determination unit configured to determine whether the user information identified by the first identification unit is identical to the user information identified by the second identification unit;
a suspending unit configured to suspend print processing of the received print data when the second determination unit determines that the user information identified by the first identification unit is not identical with the user information identified by the second identification unit;
a printing unit configured to print the received print data when the second determination unit determines that the user information identified by the first identification unit is identical to the user information identified by the second identification unit; and
a control unit configured to permit logon of a user who corresponds to the user information contained in the received print data and to inhibit logon of a user different from the user corresponding to the user information contained in the received print data, in a case where a request for logging on the printing apparatus is received during printing of the received print data by the printing unit, wherein the printing unit prints the received print data when the first determination unit determines that no user is currently logged on.

3. The printing apparatus according to claim 2, wherein the user information is a user ID identifying a user or a division ID identifying a group.

4. A printing apparatus comprising:
a reception unit configured to receive print data;
a first identification unit configured to identify user information contained in the received print data;
a first determination unit configured to determine whether there is any user currently logged on the printing apparatus;
a second identification unit configured to identify user information corresponding to a user when the first determination unit determines that the user is currently logged on the printing apparatus;
a second determination unit configured to determine whether the user information identified by the first identification unit is identical to the user information identified by the second identification unit;
a suspending unit configured to suspend print processing of the received print data when the second determination unit determines that the user information identified by the first identification unit is not identical with the user information identified by the second identification unit;
a printing unit configured to print the received print data when the second determination unit determines that the user information identified by the first identification unit is identical to the user information identified by the second identification unit;
a control unit configured to permit logon of the user who corresponds to the user information contained in the received print data and to inhibit logon of a user different from the user corresponding to the user information contained in the received print data, in a case where a request for logging on the printing apparatus is received during printing of the received print data by the printing unit; and
a storage unit configured to store a plurality of print data,
wherein the second determination unit determines whether user information corresponding to leading print data of the plurality of print data stored in the storage unit is identical to the user information identified by the second identification unit, and the suspending unit shifts the leading print data to the end of the plurality of print data stored in the storage unit when the second determination unit determines that the user information identified by the first identification unit and the user information identified by the second identification unit are not identical to each other.

5. A method for controlling a printing apparatus, comprising:
receiving print data;
identifying user information contained in the received print data;
judging whether a user, who corresponds to user information which is different from the identified user information, has been logged on the printing apparatus;
printing, if it is judged that the user, who corresponds to user information which is different from the identified user information, has not been logged on the printing apparatus, the received print data;
printing, if it is judged that the user, who corresponds to user information which is different from the identified user information, has been logged on the printing apparatus, the received print data in response to logout of the user from the printing apparatus; and
permitting logon of a user who corresponds to the user information contained in the received print data and inhibiting logon of a user different from the user corresponding to the user information contained in the received print data, in a case where a request for logging on the printing apparatus is received during printing of the received print data.

6. A non-transitory computer-readable storage medium storing computer-executable process steps, the computer-executable process steps causing a computer to execute a method for controlling a printing apparatus, the method comprising:
receiving print data;
identifying user information contained in the received print data;
judging whether a user, who corresponds to user information which is different from the identified user information, has been logged on the printing apparatus;
printing, if it is judged that the user, who corresponds to user information which is different from the identified user information, has not been logged on the printing apparatus, the received print data;
printing, if it is judged that the user, who corresponds to user information which is different from the identified user information, has been logged on the printing apparatus, the received print data in response to logout of the user from the printing apparatus; and
permitting logon of a user who corresponds to user information contained in the received print data and inhibiting logon of a user different from the user corresponding to the user information contained in the received print data, in a case where a request for logging on the printing apparatus is received during printing of the received print data.

7. A printing apparatus comprising:
a reception unit configured to receive print data;
a first identification unit configured to identify user information contained in the received print data;
a first determination unit configured to determine whether there is any user currently logged on the printing apparatus;
a second identification unit configured to identify user information corresponding to a user when the first determination unit determines that the user is currently logged on the printing apparatus;
a second determination unit configured to determine whether the user information identified by the first identification unit is identical with the user information identified by the second identification unit;
a suspending unit configured to suspend print processing of the received print data when the second determination unit determines that the user information identified by the first identification unit is not identical with the user information identified by the second identification unit;

a printing unit configured to print the received print data when the second determination unit determines that the user information identified by the first identification unit is identical with the user information identified by the second identification unit; and a control unit configured to permit logon of a user who corresponds to the user information contained in the received print data and to inhibit logon of a user different from the user corresponding to the user information contained in the received print data, in a case where a request for logging on the printing apparatus is received during printing of the received print data by the printing unit, wherein the printing unit prints the received print data when the first determination unit determines that a user is not currently logged on the printing apparatus.

* * * * *